(12) United States Patent
Harris

(10) Patent No.: US 7,616,418 B2
(45) Date of Patent: Nov. 10, 2009

(54) MITIGATION OF CURRENT COLLAPSE IN TRANSIENT BLOCKING UNITS

(75) Inventor: Richard A. Harris, Karana Downs (AU)

(73) Assignee: Bourns, Inc., Riverside, CA (US)

( * ) Notice: Subject to any disclaimer, the term of this patent is extended or adjusted under 35 U.S.C. 154(b) by 185 days.

(21) Appl. No.: 11/977,008

(22) Filed: Oct. 22, 2007

(65) Prior Publication Data

US 2008/0137249 A1 Jun. 12, 2008

Related U.S. Application Data

(60) Provisional application No. 60/854,816, filed on Oct. 27, 2006.

(51) Int. Cl.
*H02H 9/00* (2006.01)
*H02H 1/00* (2006.01)

(52) U.S. Cl. ........................................ 361/58

(58) Field of Classification Search ................... 361/58
See application file for complete search history.

(56) References Cited

U.S. PATENT DOCUMENTS

| 5,742,463 | A | 4/1998 | Harris |
| 6,768,146 | B2 | 7/2004 | Yoshida |
| 7,002,189 | B2 | 2/2006 | Kikkawa |
| 7,262,946 | B2 * | 8/2007 | Harris et al. ............. 361/91.1 |
| 7,324,315 | B2 * | 1/2008 | Harris ....................... 361/58 |
| 7,492,566 | B2 * | 2/2009 | Harris ....................... 361/127 |
| 2005/0152080 | A1 | 7/2005 | Harris et al. |
| 2006/0098363 | A1 | 5/2006 | Hebert et al. |
| 2006/0158812 | A1 | 7/2006 | Harris et al. |
| 2006/0261407 | A1 | 11/2006 | Blanchard et al. |
| 2008/0123232 | A1 * | 5/2008 | Harris et al. ............. 361/56 |
| 2008/0272397 | A1 * | 11/2008 | Koudymov et al. ....... 257/192 |

* cited by examiner

*Primary Examiner*—Ronald W Leja
(74) *Attorney, Agent, or Firm*—Lumen Patent Firm

(57) ABSTRACT

A transient blocking unit (TBU) includes at least two depletion mode transistors connected to each other such that they can rapidly switch from a normal low-impedance state to a high-impedance current blocking state in response to an over-voltage or over-current condition. This behavior makes TBUs useful for protecting electrical devices and circuit from harmful electrical transients. Some kinds of transistors can exhibit a phenomenon known as current collapse, where channel conductance is temporarily reduced after exposure to high voltage. Although current collapse is undesirable, transistors exhibiting current collapse can have otherwise favorable properties for TBU applications. According to the present invention, a TBU is provided where a diode is placed in parallel with a TBU transistor that can exhibit current collapse. The diode prevents high power dissipation in a current collapsed transistor, thereby reducing the vulnerability of the TBU to permanent damage or destruction in service.

14 Claims, 4 Drawing Sheets

MITIGATION OF CURRENT COLLAPSE IN TRANSIENT BLOCKING UNITS

CROSS REFERENCE TO RELATED APPLICATIONS

This application claims the benefit of U.S. provisional patent application 60/854,816, filed on Oct. 27, 2006, entitled "Mitigation of current collapse in GaN Transient Blocking Units", and hereby incorporated by reference in its entirety.

FIELD OF THE INVENTION

This invention relates to protecting electrical devices and circuits from damage by electrical transients.

BACKGROUND

Transient blocking units (TBUs) have been in use for some time for protecting sensitive electrical devices and/or circuits from damage caused by electrical transients. An early reference relating to TBUs is U.S. Pat. No. 5,742,463 by Harris. FIG. 1 shows a simple example of a conventional TBU. In this example, two depletion mode (i.e., normally-on) transistors, Q1 and Q3, are connected in series such that the same current $I_{TBU}$ flows through Q1 and Q3. As $I_{TBU}$ increases, $V_{DS}$ of Q1 and $V_{SD}$ of Q3 both increase. The transistor types are selected such that as $V_{DS}$ of Q1 increases, the voltage applied to the gate of Q3 acts to shut off Q3. Similarly, as $V_{SD}$ of Q3 increases, the voltage applied to the gate of Q1 acts to shut off Q1. The positive feedback inherent in this arrangement leads to a rapid transition of the TBU from a normal low-impedance state to a high-impedance current blocking state once $I_{TBU}$ exceeds a predetermined threshold. In operation, a TBU can switch to its high-impedance state in response to an over-voltage or over-current condition from an electrical source, thereby protecting electrical devices or circuits connected to the TBU.

The TBU example of FIG. 1 is a unipolar (or uni-directional) TBU because it is only effective to block surges having a predetermined polarity (i.e., either positive surges or negative surges). FIG. 2 shows a conventional bipolar TBU. The circuit of FIG. 2 can be understood as providing two unipolar TBUs having opposite polarity in series. The first unipolar TBU is formed by the combination of Q1 and Q3, and the second unipolar TBU is formed by the combination of Q2 and Q3. FIG. 2 also shows a typical application for a TBU, where it is placed in series between an electrical source 202 and a load 204 to be protected.

TBUs have been investigated for both low voltage applications and high voltage applications. High voltage applications tend to require specialized TBU device and circuit approaches, e.g., as considered in US 2006/0098363 and US 2006/0261407. As another example, transistors fabricated with silicon carbide (SiC) can have increased breakdown voltage compared to Si transistors. However, SiC transistors are very costly to fabricate.

More recently, Gallium Nitride (GaN) material technology has been employed for high voltage device fabrication, e.g., as considered in U.S. Pat. No. 6,768,146. GaN has a large bandgap combined with high carrier mobility, making it an attractive material (compared to Si) for high-voltage and highly conductive devices. GaN has a significant advantage with respect to SiC because it can be deposited on non-native substrates relatively easily, thereby significantly reducing the cost of GaN devices compared to SiC devices. It is estimated that GaN devices may be up to 10× less expensive than comparable SiC devices.

However, GaN transistors exhibit a highly undesirable "current collapse" behavior, where the channel conductance of a GaN transistor decreases markedly after the device is exposed to high voltage at the source and/or drain. The conductance eventually recovers, although it can take a long time to do so (e.g., order of 10 s worst case). Current collapse is attributed to traps in the GaN material arising from substrate defects. Methods for reducing current collapse, either by reducing defects in the GaN, or in details of device design (e.g., as considered in U.S. Pat. No. 7,002,189) are under investigation. However, it is expected that GaN transistors will continue to exhibit current collapse for at least several years, and perhaps indefinitely.

This current collapse issue renders GaN transistors useless for most high voltage switching applications, despite the otherwise favorable cost and performance provided by GaN. In fact, elimination of the current collapse phenomenon in GaN transistors (by improved fabrication technology) is typically regarded by art workers as a prerequisite for the use of GaN transistors in commercial HV applications. Accordingly, it would be an advance in the art to provide a TBU suitable for use with high voltage transistors that can exhibit current collapse, such as GaN transistors.

SUMMARY

According to the present invention, a TBU is provided where a diode is placed in parallel with a TBU transistor that can exhibit current collapse. The diode prevents high power dissipation in a current collapsed transistor, thereby reducing the vulnerability of the TBU to permanent damage or destruction in service. The diode polarity is opposite relative to the polarity of the transistor it protects. More specifically, if a TBU transistor can operate to block positive current, then its associated diode freely passes negative current. Similarly, if a TBU transistor can operate to block negative current, then its associated diode freely passes positive current.

The use of diodes to protect TBU transistors is applicable to various kinds of TBUs, such as unipolar and bipolar TBUs. More generally, protection of TBU transistors with diodes according to the invention does not depend on the details of the TBU control circuit connected to the protected transistors.

By protecting the TBU transistors with diodes, TBU designs can incorporate transistors which exhibit current collapse (e.g., GaN JFETs), but which otherwise have favorable characteristics, such as low cost combined with improved high-voltage performance.

DETAILED DESCRIPTION

To better appreciate the present invention, it is helpful to consider the implications of current collapse in a TBU transistor. The first point to note is that the long recovery time from current collapse is not really a problem for the TBU application. The reason for this is that a TBU transistor will only be current collapsed after it has shut off in response to an over-voltage or over-current condition. In most cases, it is not required to recover rapidly from this shut-off condition.

Figure 1:
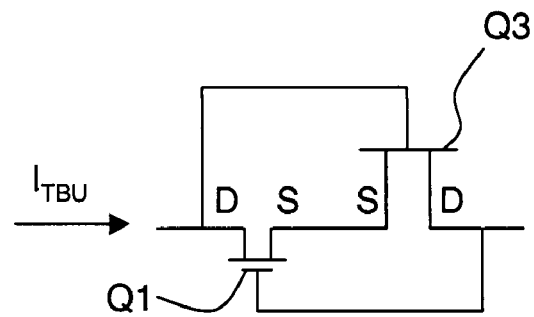
FIG. 1 shows a prior art unipolar TBU.

However, current collapse can increase the vulnerability of TBU transistors to permanent damage in operation. For example, consider the conventional TBU of FIG. 1, and assume that transistor Q1 is in a current collapsed state (i.e., low conductivity) immediately after the circuit of FIG. 1 blocks a positive transient. If this positive transient is immediately followed by a negative transient, then the unipolar circuit of FIG. 1 will not act to block the negative transient. Ordinarily, such a negative transient would pass harmlessly through the circuit of FIG. 1, because transistors Q1 and Q3 would both provide low impedance, thereby ensuring low power dissipation in Q1 and Q3. However, in the situation assumed here, Q1 provides a high impedance to the negative transient because of the assumed current collapse, and as the negative transient will not act to drive the TBU circuit into its fully off low power dissipation state, significant power dissipation will occur in Q1, dependent purely on its present current collapsed state. Such power dissipation could be sufficient to permanently damage or destroy Q1, thereby rendering the TBU inoperative. The situation of a positive transient immediately followed by a negative transient is not uncommon in practice, since transients and surges frequently have an oscillatory or "ringing" behavior.

Figure 3:
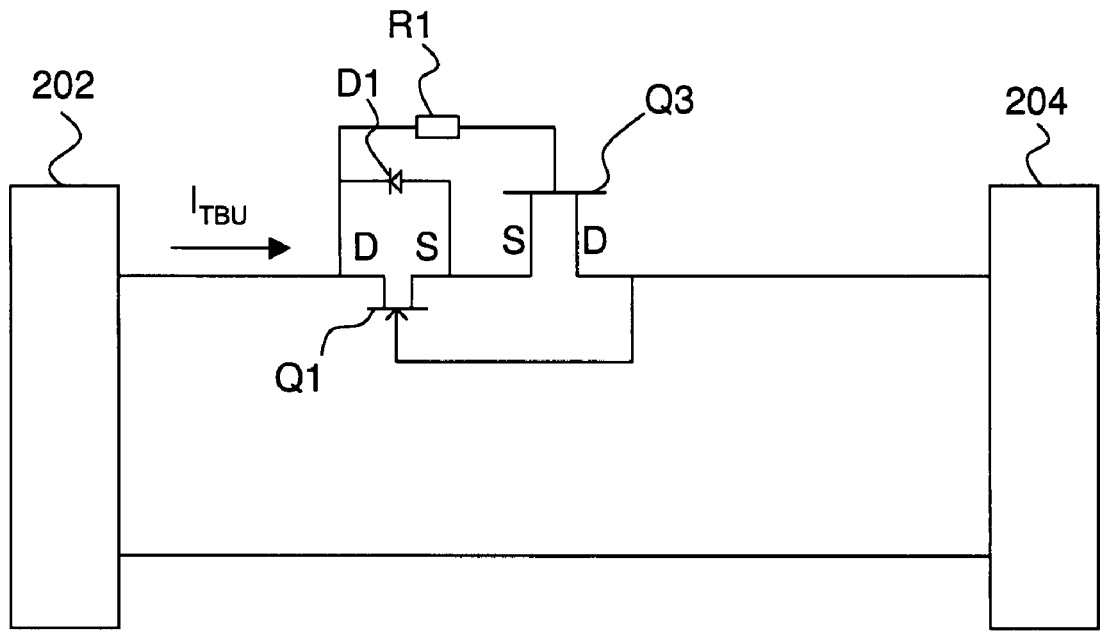
FIG. 3 shows a unipolar TBU according to a first embodiment of the invention.

FIG. 3 shows a unipolar TBU according to a first embodiment of the invention. In this example, a diode D1 is connected from source to drain of Q1. Optionally, impedance R1 (which may include a diode) may also be present, in cases where it is desirable or necessary to alter the voltage or current at the gate of Q3 compared to that provided by a simple connection. Practice of the invention does not depend critically on passive biasing element R1. The polarities of depletion mode transistors Q1 and Q3 are selected such that positive transients of $I_{TBU}$ (i.e., in the direction of the $I_{TBU}$ arrow on FIG. 3) are blocked by the TBU if they exceed the TBU threshold. When $I_{TBU}$ is negative, D1 provide a low impedance shunt path across Q1. Thus, D1 acts to protect Q1 from the above-described damage mechanism if Q1 exhibits current collapse after blocking a positive transient.

In more general terms, it is helpful to think in terms of a controllable current (i.e., $I_{TBU}$) that can have either of two opposite polarities (i.e., positive and negative). TBU transistors can be protected from their own current collapse by having a diode connected in parallel to the transistor. The diode polarity is selected to provide a low impedance for a current polarity opposite the current polarity that can be blocked by that transistor. For example, if Q1 can block positive transients, D1 provides a low impedance for negative current. Similarly, if Q1 can block negative transients, D1 provides a low impedance for positive current. Effectively, Q1 is removed from the circuit when current flows in a direction it cannot block.

Although the invention can be practiced with Q1 and Q3 being any kind of transistor, it is preferred for Q1 to be a GaN junction field-effect transistor. The resulting TBU can be designed to exploit the advantages of low cost and good high voltage performance provided by GaN transistors, without suffering from increased damage vulnerability due to GaN current collapse.

Figure 4:
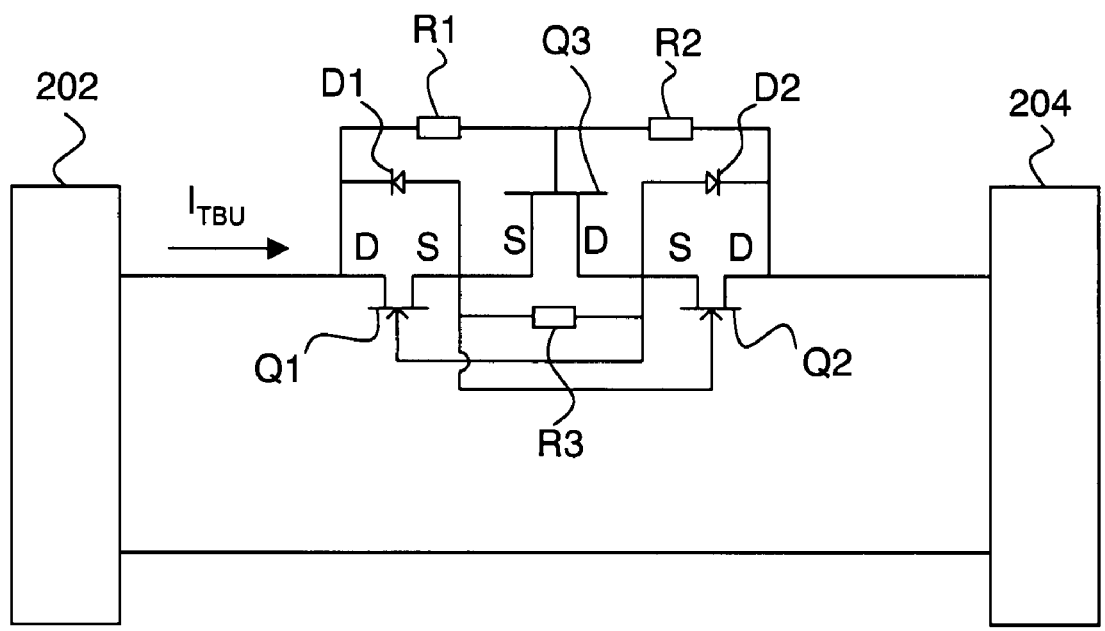
FIG. 4 shows a bipolar TBU according to a second embodiment of the invention.

FIG. 4 shows a bipolar TBU according to a second embodiment of the invention. This example can be understood as two unipolar TBUs of the type shown on FIG. 3 having opposite polarity connected in series and sharing Q3. The TBU formed by transistors Q1 and Q3 blocks surges having a first polarity (e.g., positive), and the TBU formed by transistors Q2 and Q3 blocks surges having a second polarity (e.g., negative). The roles of positive and negative surge polarity can be reversed in this example, provided the polarities of D1 and D2 are also reversed. Because Q1 can act to block positive transients, its corresponding diode D1 provides low impedance to negative current. Similarly, Q2 can act to block negative transients, so its corresponding diode D2 provides low impedance to positive current.

For example, if Q1 blocks the first half cycle of an oscillatory high current surge and is affected by current collapse, Q1 is bypassed by D1 when the current of the negative half cycle of the surge begins to flow. As a result, negative current flows unhindered through the TBU until the TBU formed by transistors Q2 and Q3 switches to a current blocking state. Once this occurs, both Q1 and Q2 may be affected by current collapse, and no current will flow through the TBU in either direction until the surge voltage goes below the hold voltage of the TBU long enough for Q1 and Q2 to recover from current collapse. If D1 were not present, then the first negative half cycle of the surge could destroy Q1.

Optional impedances R1, R2, and/or R3, any of which can include a diode, may be included in the circuit of FIG. 4. Practice of the invention does not depend critically on details of these passive biasing elements.

Although the invention can be practiced with Q1, Q2 and Q3 being any kind of transistor, it is preferred for Q1 and Q2 to be GaN junction field-effect transistors. The resulting bipolar TBU can be designed to exploit the advantages of low cost and good high voltage performance provided by GaN transistors, without suffering from increased damage vulnerability due to GaN current collapse. Preferred specifications for GaN Q1 and Q2 in this example include >600 V blocking voltage, threshold voltage $-2<Vp<-0.5$ and resistance $<3\Omega$.

Figure 5:
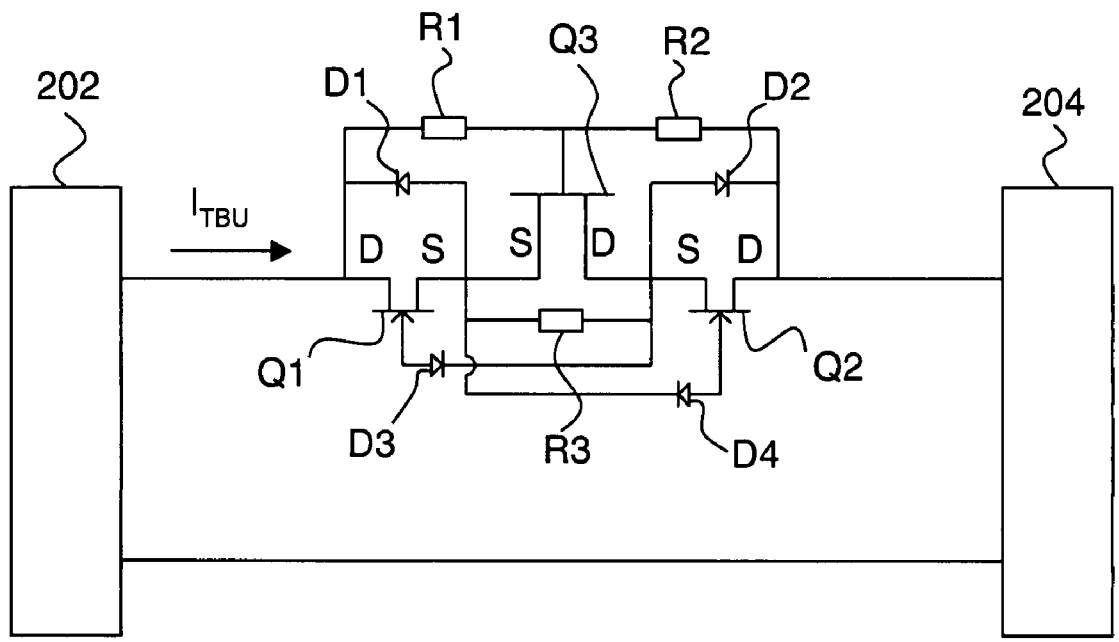
FIG. 5 shows a modified version of the embodiment of FIG. 4.

FIG. 5 shows a modified version of the embodiment of FIG. 4. This example differs from the example of FIG. 4 by the addition of diodes D3 and D4. The purpose of diodes D3 and D4 is to prevent one of the unipolar TBUS from interfering with the other unipolar TBU. For example, when Q1 and Q3 are forming the active TBU for blocking positive surges, the gate junction of Q2 can short the voltages generated across Q3. In such cases, D4 can be added to prevent this short. Similarly, D3 can be added in cases where the gate junction of Q1 acts to short the voltages across Q3 for negative surges. The orientations of D3 and D4 are selected to be opposite to the orientation of the corresponding gate junctions of Q1 and Q2. In this manner, current flow to or from the gates of Q1 and Q2 is prevented, even in cases where Q1 and Q2 are JFETs as opposed to insulated gate FETs (e.g. MOSFETs). In preferred embodiments where Q1 and Q2 are GaN transistors, the forward diode conduction voltage of the gate junctions of Q1 and Q2 can be as high as 5 V, which may be sufficient by itself to remove the above-described shorting of Q3 by gate junctions. Therefore, the approaches of FIGS. 4 and 5 are both preferred.

Figure 6:
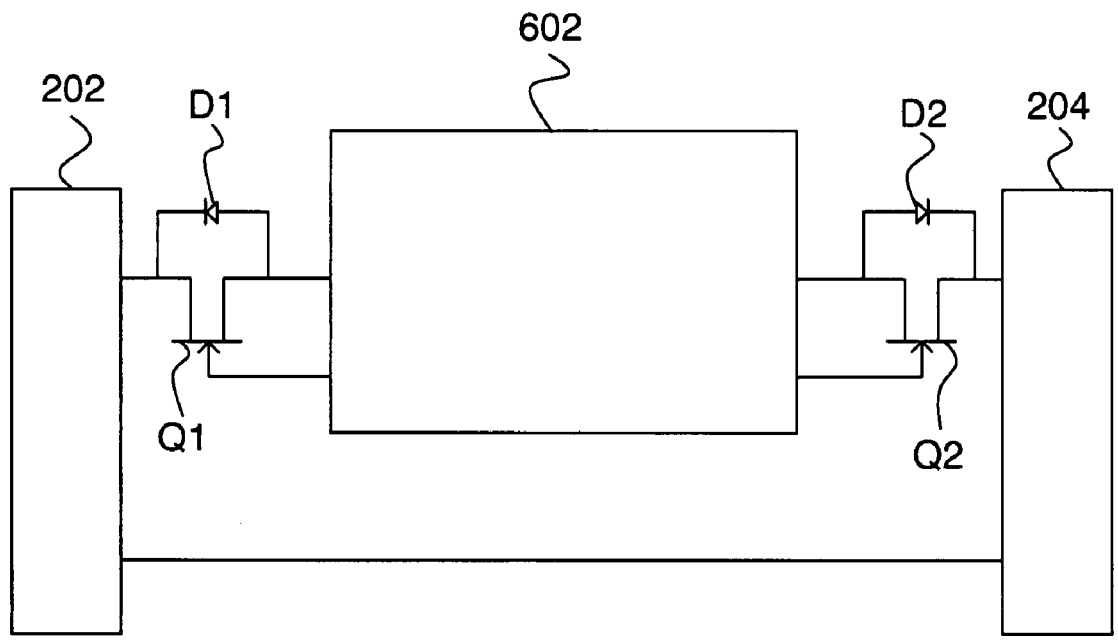
FIG. 6 shows a TBU according to a third embodiment of the invention, where a low voltage TBU core controls high voltage transistors.

FIG. 6 shows a TBU according to a third embodiment of the invention, where a low voltage TBU core controls high voltage transistors. In this example, Q1 and Q2 are high voltage GaN JFETs protected by diodes D1 and D2 as described above. A core TBU 602 is connected to the gates of Q1 and Q2, to the source of Q1 and to the source of Q3. Core TBU 602 acts as a control circuit to switch off Q1 if a TBU current having a first polarity (e.g., positive) exceeds threshold, and acts to switch off Q2 if a TBU current having a second polarity opposite to the first polarity (e.g., negative)

exceeds threshold. An advantage of this approach is that core TBU 602 does not need to have high voltage capability. Instead, transistors Q1 and Q2 provide the high voltage capability (e.g., GaN FETs for Q1 and Q2 can have >600 V blocking voltage, threshold voltage>15V and resistance<3Ω).

Figure 2:
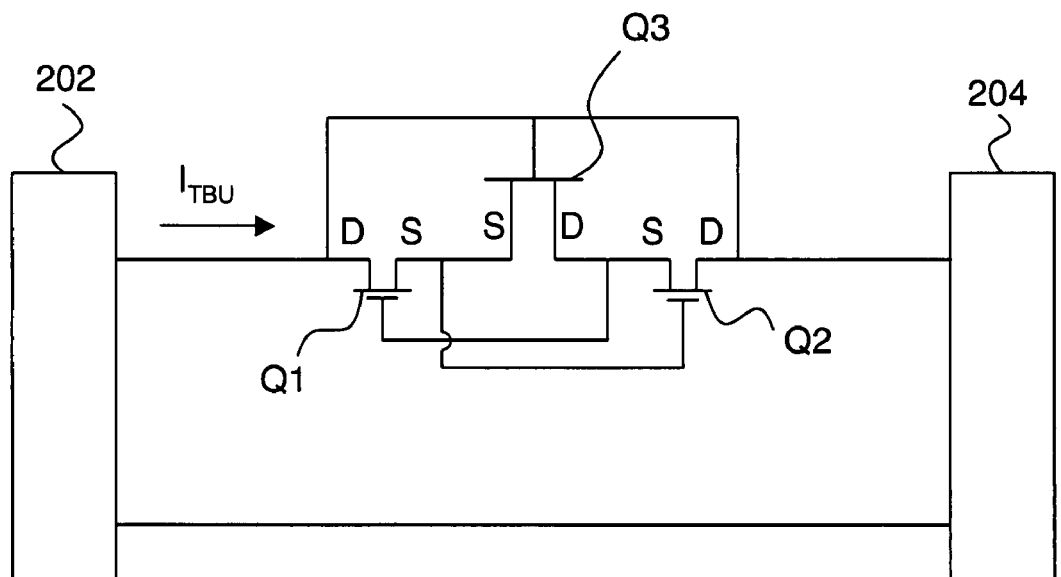
FIG. 2 shows a prior art bipolar TBU.
Figure 7:
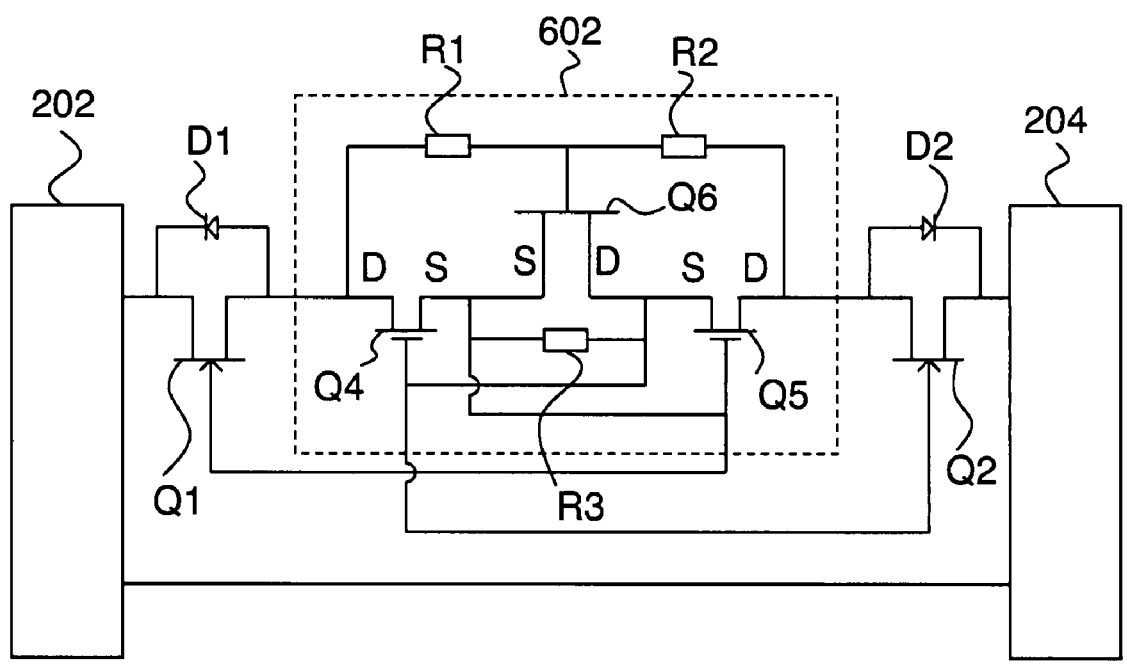
FIG. 7 shows an example of the embodiment of FIG. 6.

FIG. 7 shows an example of the embodiment of FIG. 6. In this example, core TBU 602 includes MOSFETs Q4 and Q5 and JFET Q6 which act as a TBU as described in connection with FIG. 2. Optional biasing elements R1, R2, and/or R3 can be included, but practice of the invention does not depend critically on details of these passive biasing elements.

It is helpful to regard core TBU 602 of FIG. 6 as one example of a control circuit used for practicing embodiments of the invention. In this example, the control circuit is connected to the gate of Q1, the gate of Q2, the source of Q1, and the source of Q2.

The embodiment of FIG. 3 shows another example of such a control circuit. In this example, the control circuit includes a transistor (Q3) controlling a current from its source to its drain, where $I_{TBU}$ flows through both Q1 and Q3 in series, and where the gate of Q3 is connected to the drain of Q1, the source of Q3 is connected to the source of Q1, and the drain of Q3 is connected to the gate of Q1.

The embodiment of FIG. 4 shows another example of such a control circuit. In this example, the control circuit includes a transistor Q3, a connection between the source of Q1 and the source of Q3, a connection between the drain of Q3 and the source of Q2, a connection between the drain of Q3 and the gate of Q1, a connection between the source of Q3 and the gate of Q2, a connection between the gate of Q3 and the drain of Q1 (which may include an optional passive component), and a connection between the gate of Q3 and the drain of Q2 (which also may include an optional passive component).

In more general terms, the control circuit is connected to the gate of Q1 and to at least one of the source and drain of Q1. For a first polarity of a controllable current (i.e., $I_{TBU}$), the control circuit acts primarily to switch off Q1 responsive to an over-voltage or over-current condition. For a bipolar TBU, the control circuit is also connected to the gate of Q2 and to at least one of the source and drain of Q2. For a second polarity of the controllable current opposite to the first polarity, the control circuit in a bipolar TBU acts primarily to switch off Q2 responsive to an over-voltage or over-current condition.

The preceding description has been by way of example as opposed to limitation. For instance, transistors Q1 and Q2 are shown as N-channel JFETs on the schematics of FIGS. 3-7. This corresponds to preferred embodiments of the invention where Q1 and Q2 are GaN transistors. However, the invention can be practiced for TBUs having any kind of transistors.

In the preceding examples, diodes D1 and/or D2 are employed to protect transistors that can exhibit current collapse. More generally, any uni-directional shunt circuit (e.g., a diode, diode+resistor in series, etc.) connected to the source and drain of a transistor can be employed for such protection. The functionality provided by the uni-directional shunt circuit can be regarded as a voltage limiting function, where reverse voltages across a transistor are limited to values substantially less than a reverse breakdown voltage of the transistor.

Here "forward" and "reverse" with respect to a transistor are defined by reference to breakdown voltages of a transistor: the drain-source polarity having the higher breakdown voltage is forward polarity, while the drain-source polarity having the lower breakdown voltage is reverse polarity. Current flow through the transistor responsive to forward applied voltage has forward current polarity. Current flow through the transistor responsive to reverse applied voltage has reverse current polarity.

The functionality provided by the uni-directional shunt circuit can also be regarded as providing an alternate path for reverse current flow in parallel to the transistor channel (which may be current collapsed). Circuits (e.g., as in the previous examples) can be configured such that this alternate current path is irrelevant in normal operation, and is only active when the transistor channel is current collapsed. From this point of view, one aspect of some embodiments of the invention is detection of a current collapsed condition in a transistor and automatic provision of an alternate current path around such current collapsed transistor.

Because the reverse breakdown voltage tends to be much less than the forward breakdown voltages, it tends to be much easier to damage transistors by application of excess reverse voltage. Thus the reverse voltage limiting capability provided by the uni-directional shunt circuit is particularly valuable. For example, if the shunt is a diode, the voltage is limited to a value comparable to the voltage drop across the diode when the diode is forward biased.

The preceding description also relates specifically to TBU applications of GaN transistors. However, the idea of protecting GaN transistors from excessive reverse voltage (which can be induced by current flow through a current collapsed channel) by a uni-directional shunt circuit to a GaN is applicable to other circuit applications in addition to the TBU application. Such protected GaN transistors are expected to be of greatest interest for applications where the recovery time of a GaN transistor from its current collapsed condition is not a problem (i.e., like the TBU application).

The invention claimed is:

1. A transient blocking unit (TBU) comprising:
    a first depletion mode transistor having a first gate controlling a first current between a first source and a first drain;
    a first uni-directional shunt circuit connected to said first source and to said first drain; and
    a control circuit connected to said first gate and to at least one of said first source and said first drain;
    wherein said TBU provides an automatic shut-off function of a controllable current passing through said TBU responsive to an over-voltage or over-current condition, and is thereby capable of protecting an electrical load connected in series with said TBU from said over-voltage or over-current condition;
    wherein, for a first polarity of said controllable current, said control circuit acts primarily to switch off said first depletion mode transistor responsive to an over-voltage or over-current condition, thereby shutting off flow of said first current and of said controllable current;
    wherein said first uni-directional shunt circuit is disposed to limit a voltage between said first source and said first drain to a value substantially less than a reverse breakdown voltage of said first depletion mode transistor when said controllable current has a second polarity opposite to said first polarity.

2. The transient blocking unit of claim 1, further comprising:
    a second depletion mode transistor having a second gate controlling a second current between a second source and a second drain; and
    a second uni-directional shunt circuit connected to said second source and to said second drain;
    wherein said control circuit is connected to said second gate and to at least one of said second source and said second drain;

wherein said controllable current through said transient blocking unit includes said first current and said second current in series;

wherein, for said second polarity of said controllable current, said control circuit acts primarily to switch off said second depletion mode transistor responsive to an over-voltage or over-current condition;

wherein said second uni-directional shunt circuit is disposed to limit a voltage between said second source and said second drain to a value substantially less than a reverse breakdown voltage of said second depletion mode transistor when said controllable current has said first polarity.

3. The transient blocking unit of claim 2, wherein said control circuit comprises a core transient blocking unit connected to said first gate, said second gate, said first source and said second source;

wherein said controllable current passes through said core transient blocking unit;

wherein said core transient blocking unit comprises a circuit to apply voltages to at least one of said first and second gates to shut off said controllable current, responsive to said over-voltage or over-current condition.

4. The transient blocking unit of claim 2, wherein said control circuit comprises:

a third transistor having a third gate, a third source and a third drain;

a connection between said first source and said third source;

a connection between said third drain and said second source;

a connection between said third drain and said first gate;

a connection between said third source and said second gate;

a connection between said third gate and said first drain including a first passive component; and a connection between said third gate and said second drain including a second passive component.

5. The transient blocking unit of claim 4, further comprising a connection between said third source and said third drain including a third passive component.

6. The transient blocking unit of claim 4, wherein said first transistor comprises a junction field effect transistor having a first gate junction, and wherein said connection between said third drain and said first gate comprises a diode having opposite polarity relative to said first gate junction.

7. The transient blocking unit of claim 4, wherein said second transistor comprises a junction field effect transistor having a second gate junction, and wherein said connection between said third source and said second gate comprises a diode having opposite polarity relative to said second gate junction.

8. The transient blocking unit of claim 2, wherein said first depletion mode transistor comprises a GaN junction field-effect transistor and wherein said second depletion mode transistor comprises a GaN junction field-effect transistor.

9. The transient blocking unit of claim 2, wherein said first uni-directional shunt circuit comprises a diode or a diode in series with a resistor, and wherein said second uni-directional shunt circuit comprises a diode or a diode in series with a resistor.

10. The transient blocking unit of claim 1, wherein said first depletion mode transistor comprises a GaN junction field-effect transistor.

11. The transient blocking unit of claim 1, wherein said control circuit comprises a third transistor having a third gate controlling a flow of a third current between a third source and a third drain;

wherein said controllable current includes said first current and said third current in series;

wherein said third gate is connected to said first drain;

wherein said third source is connected to said first source;

wherein said third drain is connected to said first gate.

12. The transient blocking unit of claim 1, wherein said first uni-directional shunt circuit comprises a diode or a diode in series with a resistor.

13. A current collapse protected GaN transistor comprising:

a GaN field effect transistor having a gate, a source and a drain; and a uni-directional shunt circuit connected to said source and to said drain;

wherein a forward breakdown voltage of said GaN transistor for a first drain-source voltage polarity is greater than a reverse breakdown voltage of said GaN transistor for a second drain-source voltage polarity opposite to said first polarity;

wherein said uni-directional shunt circuit is disposed to limit a voltage between said source and said drain having said second polarity to a value substantially less than said reverse breakdown voltage;

whereby, if said GaN transistor exhibits current collapse, potentially damaging power dissipation in said current collapsed transistor under applied reverse voltage is prevented by said uni-directional shunt circuit.

14. The transistor of claim 13, wherein said uni-directional shunt circuit is configured to automatically provide an alternate path for reverse current in parallel with said source and said drain, responsive to a current collapsed condition of said GaN field effect transistor.

* * * * *